March 15, 1960  A. A. J. QUINTIN  2,928,729
TREATMENT OF ORES OR THE LIKE
Filed Nov. 4, 1958
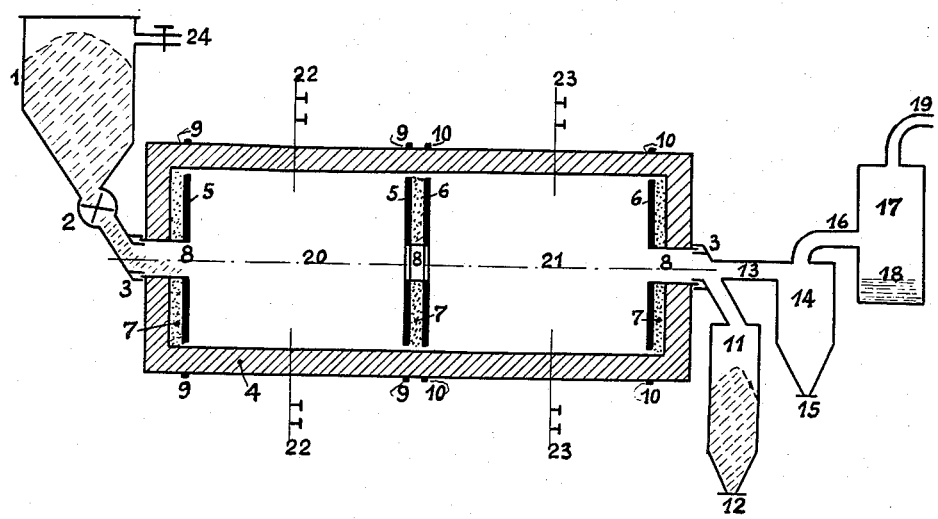
INVENTOR
ALBERT ANDRE JOSEPH QUINTIN
ATTORNEY

United States Patent Office 2,928,729
Patented Mar. 15, 1960

2,928,729

TREATMENT OF ORES OR THE LIKE

Albert André Joseph Quintin, Overpelt, Belgium, assignor to Compagnie des Metaux d'Overpelt-Lommel et de Corphalie, S.A., Overpelt-lez-Neerpelt, Belgium Application November 4, 1958, Serial No. 771,854

2 Claims. (Cl. 75—14)

This invention relates to the electro-thermal treatment of ores or like materials, mixed or not with other materials, in a granular state or in a finely-divided form, with a view to producing physical or chemical changes in the material or reactions between various materials.

It is known to heat materials or mixtures of materials, in the form of grains or in a finely-divided form, which are sufficiently conductive of electricity at the temperature at which it is desired to maintain them, with a view to producing certain physical or chemical changes in them, or certain reactions, by causing an electric current to pass through said materials or mixtures which heats them by Joule effect.

Generally however, when the said materials have a tendency to melt at about the temperature desired for the reaction, the Joule effect produces a sticking of the grains together, and generally their subsequent fusion.

Many processes based upon endothermic reactions requiring relatively high temperatures, utilize the heating Joule effect of an electric current; either they produce intentionally a fusion of the materials subjected to the reaction or at least a fusion of the solid residues left by the reaction, or, alternatively, they try to avoid the sticking together and/or the fusion by the addition of important quantities of non-fusible porous materials, such as coke, which "dry" the mixture to a sufficient extent to permit its removal by gravity in a non-fused state outside the receptacle in which the heating and the reaction take place.

The present invention has for its object to heat the reacting materials in a uniform manner by Joule effect without producing their sticking together, by sintering, and/or fusion at any point. The invention applies more particularly to the reduction at a low temperature of roasted zinc ore, and more especially to the case when the latter ore is in the form of small grains of between about 0.5 mm. and 3.5 mm. diameter, such as those which may be obtained by a preliminary granulation of the fine raw ore followed by a roasting in a semi-suspension state. See for instance U.S.P. 2,797,987 dated July 2, 1957.

The invention consists in a process for an electro-thermal treatment of a material divided into fine particles such as grains, in which an electric current is passed through the material to heat it by Joule effect while the material is stirred to renew the contact surfaces between the particles thus continuously breaking the passage of the current almost as soon as it has been produced, and simultaneously controlling the intensity of the current to maintain the temperature of the material at a level lower than that at which the material commences to sinter.

The materials to be treated in the form of grains or in a finely-divided state, may be placed in a receptacle, preferably of cylindrical shape, which is well insulated from the thermal point of view. An electric current of adjustable intensity is caused to pass through the material, the receptacle being rotated to renew the contact surfaces between the grains with a frequency sufficient to avoid any local superheating of the grains and therefore their sticking together.

Such a continuous renewal of the contact surfaces has for its effect to break, almost as soon as they are formed, the chains of grains through which the current has a tendency to pass in preference and which, if unopposed, would lead to a superheating of the grains, more particularly where their surfaces come into contact with each other, at a temperature which is higher than the average temperature of the charge, and would therefore produce zones of overheating in which the grains would stick to one another and the material might become sintered or would even fuse.

Moreover, the continuous mixing of the charge, due to the rotation of the receptacle contributes also in a mechanical way to maintain the same temperature at all points of the mass.

For stirring certain charges in a more intense manner it may sometimes be advantageous to reverse the movement of rotation of the receptacle from time to time. For other less fusible charges it may be sufficient to produce a rotation of the receptacle in an intermittent manner.

In the particular case of the reduction of zinc ore (roasted blende or zinc oxide), preferably in a state of grains of a diameter comprised between about 0.5 mm. and about 3.5 mm., use is advantageously made of an apparatus such as shown diagrammatically and by way of example in the accompanying drawing.

Referring to the drawing, 1 is a hopper containing the mixture under treatment, for instance a mixture of roasted blende and reducing agent, preferably pre-heated up to little under the temperature of commencement of the reaction. It is also possible to preheat the ore and the reducing agent separately, at temperatures which are higher than the reaction temperature, and to feed them separately into the reduction furnace. When non-bituminous coal is used as the reducing agent, volatile materials are liberated during the pre-heating operation in the form of a rich distillation gas, for which numerous applications are known.

The reference numeral 2 shows a distributing device which controls the amount of material admitted per unit of time into a rotating electric drum 4 in which the reaction takes place; 3, 3 are tight joint rotating packings; the rotating drum 4 has an inner brickwork consisting of two layers: an inner layer of refractory bricks or the like which is impervious to zinc vapours and a thick layer of heat-insulating material. The reference numerals 5, 5 and 6, 6 show two couples of electrodes made preferably of refractory steel, forming a diaphragm inside the cylinder and provided with central openings; the numerals 7, 7, 7 show layers of a refractory material, which is non-conductive of electricity at the working temperature, which layers ensure an insulation of the electrodes with regard to the walls and between pairs of electrodes of different circuits; 8, 8, 8 are axial orifices through which the mixture of ore and reducing agent and the gases and vapors produced by the reaction travel to leave finally the drum. The latter is only partially filled.

If it is desired to hasten the travel of the material through the drum and/or to maintain the level of the material under the lower edge of the openings 8, 8, 8, the electrodes 5, 5 and 6, 6 may be provided with fins which raise the material in the manner of elevating wheels; also, the outlet orifice 8 may be provided with a screwlike device that hastens the exit of the material.

The numerals 9, 9 and 10, 10 show circular bands made of a metal which is good-conductive of electricity, connected to the electrodes 5, 5 and 6, 6; the current is supplied from said bands to the electrodes by means of commutator brushes (not shown). The two neighbouring electrodes situated in the middle part of the drum have the same polarity and the same voltage so as to avoid all short-circuiting between the neighbouring electrodes through the charge. Each compartment 20 and 21, or in other words, each pair of opposite electrodes is provided with its own source of current of adjustable voltage and intensity and forms a separate circuit so as to prevent any short-circuiting between the neighbouring electrodes.

A drum may of course have a single compartment and a single pair of electrodes, or more than two compartments and two pairs of electrodes.

Pyrometers 22, 22 and 23, 23 measure the temperature of the reacting material, and if necessary they act automatically upon a device for regulating the intensity of the current so as automatically to maintain a constant temperature. The latter temperature for flotation blende of a normal composition, is chosen to be comprised between 1050° and 1080° C., that is a little below the temperature at which a sintering of the gangue of the said blende commences. It should be noted that these temperatures (1050–1080° C.) are the lowest permissible in order to obtain a sufficient rapidity of the reaction. In the usual processes of thermal and electrothermal reduction of zinc ores, the usual temperatures are comprised between 1200° C. and 1350° C. But under the conditions described, and especially in the case of grains of roasted blende of about 0.5 to 3.5 mm. obtained by granulation of the crude fine blende and subsequent roasting in semi-suspension state at temperatures between 950 and 1050° C., a product is obtained which has exceptionally high reducible qualities, since it is porous and free from any sintering. With such a product the reduction is rapid and complete at these comparatively low temperatures, and more than 98% of the zinc contained in the material leave the mixture together with the CO produced, according to the well-known formula which may be summed up as follows:

$$Zn + C = Zn + CO$$

The spent mixture consisting of the gangue of the ore and of the excess of reducing agent (carbon), accumulates inside the hopper 11 where the material is cooled, sheltered from the atmospheric air in a neutral or reducing atmosphere, and from which it is periodically or continuously removed through a damper 12 or by any other suitable means. The zinc vapours and the CO enter through a conduit 13 into a cyclone 14 both being suitably heat-insulated, or are sent to any other suitable heat-insulated filtering device. Any solid material which they might have carried with them is being thus separated, and the gases and vapours enter through 16 into a condenser 17 in which the liquid zinc gathers at 18 and from which it is periodically or continuously withdrawn, whilst the CO escapes through 19 towards a suction fan (not shown) and towards its desired application.

The CO may, according to a well known technique, be cooled, filtered upon bags or otherwise, then used as a combustible gas. An interesting application consists in feeding internal combustion engines with such CO gas, which engines drive alternators, the current produced by the latter being sent to the drum 4. Sometimes it is also advantageous to send a small portion of the purified CO back into the circuit, for instance by re-injecting it into the circuit through a valve 24 and the hopper 1. An easy method is thus available for preventing all reflux of zinc vapours from the receptacle 20 back to the hopper 1, whilst ensuring a very small excess of pressure which prevents an influx of outer air. It also forms an easy way of sweeping the reaction enclosures for removing the entire amount of vapours which have been produced by the reaction. It may also be advantageous to sweep the contents of the cooling hopper 11 by means of a slow current of purified, cold CO, thus facilitating the cooling and maintaining the atmosphere in a reducing condition.

The advantages of working at the lowest possible reaction temperature are substantial:

Smaller loss of heat by radiation;

Possibility of using electrodes of stainless steel or other heat resistant alloys;

The materials are not exposed to corrosion by the sintered or fused gangue, and therefore there are practically no maintenance expenses;

Very pure zinc vapours are obtained containing a very small amount of the foreign metals contained in the ore (on the other hand it should be noted that the latter may have been treated prior to its roasting for the removal of the Pb, Cd, As and Hg, which it may contain);

The spent gangue (from the hopper 11) is absolutely dry and does not adhere to particles of unused reducing agent (carbon); a simple magnetic separation allows of collecting separately more than 98% of the reducing agent, which is preferably sent back to be charged again, whilst the gangue, practically free from carbon, may be treated by any known methods for the recovery of any metals which it may contain in a quantity sufficient to make the treatment a paying proposition.

An advantageous characteristic feature of the process according to the present invention is that owing to the fact that the residues from the reduction phase have been cooled in a non-oxidizing temperature, other metals than zinc or cadmium which have been reduced inside the drum, are contained by the gangue in a metallic state. After a first magnetic separation which removes practically the entire amount of the carbon, a differential magnetic separation allows of recovering certain metals in a concentrated state, more particularly the iron from zinc ores.

As shown in the drawing, the drum used for the reducing operation may be divided into two or more compartments. The length of such compartments is chosen so as to be able to apply a convenient and economical voltage, of 110 to 500 volts for example. For the same temperature, a charge containing zinc which has been almost completely reduced, absorbs less heat per unit of volume than a charge in which the zinc oxide is still abundant. This has for its consequence that it is advantageous progressively to increase the capacity of the compartments if it is desired that each compartment shall absorb the same amount of electric energy.

The process according to the present invention may also be carried out by means of a plurality of small cylinders arranged in series, each comprising one compartment only, and each cylinder receiving the material from the preceding compartment and forwarding it to the next compartment.

The above apparatus allows of separately collecting the zinc vapours corresponding to each successive phase of the reduction process, thus allowing to choose that portion of the vapour which is particularly pure and to condense it separately in order to obtain a zinc of high quality. The apparatus allows also of carrying out prior purification operations of zinc ore. For instance, it is possible to feed the first cylinder with roasted blende to which a reducing agent or other conductive material has been added, then a reacting agent, for instance NaCl, thus obtaining a practically complete removal of the Pb by a heating combined with feeding of an inert gas. It is obvious that in order to avoid a reduction of the zinc by the reducing agent and its removal with the impurities, it is necessary to work at a temperature lower than that at which the reduction of ZnO by C commences, if the reducing agent is used as the conductive element of the charge. It is also possible to impart electrical conductivity to the charge by adding for instance the most magnetic, and therefore the most metallic portion of the residues from a prior treatment. In that case, the reducing agent, preferably pre-heated at the reaction temperature, is admitted into the second cylinder.

It is also possible to increase the percentage of pure zinc vapour that can be collected separately by controlling the speed of the reaction in the different cylinders arranged in series by feeding regulated portions of the total reducing coal into two or more of the first cylinders. As the volatile impurities tend to depart more quickly than the zinc, the last cylinders which give pure zinc vapour will yield a higher total percentage of the whole zinc.

What I claim is:

1. A process for an electro-thermal treatment of an oxide zinc ore material divided into small particles such as grains of a highly reducible character, in which the said oxide zinc ore material is mixed with reducing agent to form a charge, the charge is introduced into a rotating receptacle in which it is, in a solid state, heated exclusively by an electric current passing through it, at about 1050° C. while its entire mass is continuously stirred to renew the contact surfaces between the particles, thus continuously breaking the passage of the current almost as soon as it has been produced, and simultaneously controlling the intensity of the current to maintain a temperature at all points of the mass of the charge, which is slightly lower than that at which the small particles of the charge and its residues commence to stick to one another, and obtaining zinc vapors which are allowed to escape, and a spent mixture consisting of a gangue from the oxide ore, ashes obtained from the spent reducing agent and any excess of reducing agent, which spent mixture is extracted from the said receptacle of treatment in the form of a dry solid mixture.

2. A process for the reduction of oxide zinc ore material as claimed in claim 1, in which the said zinc ore material in the form of highly reducible grains of a size comprised between 0.5 mm. and about 3.5 mm., is mixed with carbon, the mixture of zinc ore material and carbon is heated by means of an electric current inside a plurality of rotating receptacles, through each of which passes an electric current of adjustable intensity to maintain the temperature slightly below the level at which the grains would stick to one another, the gaseous products are separately collected from each receptacle, the volatile impurities are removed from the first receptacle of the series of receptacles and the major part of the zinc vapors is collected in a pure state in the succeeding receptacles of the said series of receptacles.

References Cited in the file of this patent

UNITED STATES PATENTS

| | | |
|---|---|---|
| 1,800,500 | Bleeker | Apr. 14, 1931 |
| 1,967,274 | Weaton | July 24, 1934 |
| 2,127,633 | Najarian | Aug. 23, 1938 |
| 2,144,914 | Debuch | Jan. 24, 1939 |
| 2,509,326 | Weaton et al. | May 30, 1950 |
| 2,598,742 | Handwerk et al. | June 3, 1952 |
| 2,676,010 | Matthies | Apr. 20, 1954 |

FOREIGN PATENTS

| | | |
|---|---|---|
| 19,973 | Great Britain | 1911 |